3,445,504
STABILIZED TEREPHTHALATE COMPOSITIONS
Paul J. Mehalso, Highland, Ind., assignor to Standard Oil Company, Chicago, Ill., a corporation of Indiana
No Drawing. Continuation-in-part of application Ser. No. 152,029, Nov. 13, 1961. This application Jan. 26, 1965, Ser. No. 428,249
Int. Cl. C07c *69/82, 149/36;* C07f *9/08*
U.S. Cl. 260—475                  5 Claims

ABSTRACT OF THE DISCLOSURE

New compositions of matter are the lower alkanol diesters of terephthalic acid containing a hindered phenol and a dialkyl phosphite as inhibitors of acid number increase and discoloration resulting from high temperature degradation. The diesters are employed as intermediates in the preparation of film- and fiber-forming super polyesters.

---

This application is a continuation-in-part of my prior applications Ser. No. 70,143, filed Nov. 18, 1960, now abandoned and Ser. No. 152,029, filed Nov. 13, 1961, now abandoned.

This invention relates to additives for imparting high temperature stability to terephthalic acid esters. More particularly, the invention concerns improving the high temperature acid-number and color stabilities of lower alkanol diesters of terephthalic acid without inhibiting the polymerization characteristics of such diesters.

Lower alkanol diesters of terephthalic acid such as dimethyl terephthalate are commonly employed as intermediates in the preparation of film- and fiber-forming super polyesters. The formation of these polyesters, of the type disclosed in U.S. Patent 2,465,319 to Whinfield and Dickson, generally involves a catalytic ester interchange between dimethyl terephthalate and a glycol such as ethylene glycol, followed by vacuum polymerization or polycondensation to produce the super polyester product.

The aforementioned reactions are usually conducted at high temperatures. In addition, the lower alkanol diesters are frequently stored and shipped in molten condition (e.g., M.P. of dimethyl terephthalate is 140.6° C.). These high temperatures are known to cause serious problems with respect to quality control in the final polyester product, and it is accordingly desirable to inhibit terephthalic acid diesters against high temperature degradation. Unfortunately, many materials which inhibit high temperature degradation of the diesters act as inhibitors of the subsequent polymerization reaction.

Accordingly, a primary object of the present invention is to provide an additive which will inhibit high temperature degradation of lower alkanol diesters of terephthalic acid but which will not materially inhibit their subsequent polymerization characteristics.

It has now been discovered that lower alkanol diesters of terephthalic acid, in particular dimethyl terephthalate, may be inhibited against high temperature degradation by incorporating in the diesters, in amounts of up to about 0.01 weight percent each, both a hindered phenol and a dialkyl phosphite. These substances, when employed conjointly, greatly enhance high temperature stability of the diesters as evidenced by maintenance of acid number (mg. KOH to neutralize one gram of diester) and freedom from discoloration.

My novel stabilizing combination of a hindered phenol and a dialkyl phosphite is also effective to stabilize lower alkanol diesters of terephthalic acid when the diesters are in combination with other materials which do not react in a deleterious fashion with the stabilizing combination. For example, a mixture of dimethyl terephthalate and dimethyl isophthalate, which can be of value for certain uses in the synthetic fiber industry, may be stabilized against both acid number increase and color deterioration with my novel stabilizing combination.

Lower alkanol diesters of terephthalic acid which may be treated in accordance with the present invention are the diesters of terephthalic acid with an alkanol having from 1 to about 8 carbon atoms per alkanol molecule. Thus, dimethyl terephthalate, diethyl terephthalate, dipropyl terephthalate, diamyl terephthalate, and dioctyl terephthalate, alone or in admixture with other materials, may be inhibited with a hindered phenol and a dialkyl phosphite.

Hindered phenols for use in accordance with the present invention are compounds having one or more phenol rings with a tertiary alkyl group, usually tertiary butyl, located ortho to each hydroxyl group to sterically hinder its reactivity. Hindered phenols as a class are well known; illustrative examples thereof include 4,4'-thio-bis (6-tert-butyl-m-cresol) ether, 4,4'-thio-bis(6-tert-butyl-o-cresol) ether, 2,6-di-tertbutyl para cresol, 4,4'methylene bis (2,6-di-tert butyl phenol), 4,4'-bis (2,6-di-tert-butyl-phenol), 2,2'-methylene bis (4-methyl-6-tert-butyl phenol), and 2,2'-methylene bis (4-ethyl-6-tert-butyl phenol), etc. Most of the aforementioned materials, in addition to numerous others, are commercially available. The 4,4'-thio-bis(6-tert-butyl-m-cresol) ether appears to be an outstanding additive ingredient. It is an important characteristic of the hindered phenol additive that it be thermally stable under the conditions of use, which may involve temperatures as high as the melting point of dimethyl terephthalate, and even higher, depending upon the melting point of the lower alkanol diester of terephthalic acid in which my stabilizing combination is used.

The second component is selected from the dialkyl phosphites. Illustrative of dialkyl phosphites, all of which have the formula:

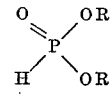

where R's are the same or different alkyl groups, advantageously having fewer than about 20 carbon atoms each, are dimethyl phosphite, diethyl phosphite, dibutyl phosphite, dioctyl phosphite, and didecyl phosphite.

The hindered phenol and the dialkyl phosphite are each advantageously employed in amounts of up to about 0.01 weight percent based on total composition. The amount is not critical however, and excellent inhibition has been achieved with amounts less than about 0.001 percent and even considerably lower. Amounts of each stabilizer as great as 0.02 weight percent, and even higher, can also be used, but if the total amount of stabilizing components is much in excess of 0.01 percent, a commercially unacceptable lowering of the freezing point of certain diesters, such as dimethyl terephthalate, may occur. Thus, the smallest amount of the stabilizing combination which will maintain product quality at acceptable levels of acid number and coloration should be employed. The necessary effective stabilizing amount of my stabilizing combination for a given diester can be readily determined by simple experimentation according to methods known to this art. The relative proportions of each component likewise are not critical, and while equal weights of each have been employed with excellent success, under particular circumstances it may be desirable to employ a preponderance of either, e.g. up to about ten times the amount of hindered phenol with respect to dialkyl phosphite, and vice versa. In any event, the amounts of each ingredient will depend on the initial diester quality and the final product specifications, and hense can be varied to meet specific situations.

The precise mechanism by which my stabilizing combination functions is not known with certainty, but I believe that it may involve an initial stabilization afforded by the hindered phenol component. In the performance of its stabilizing function, I believe the hindered phenol may be converted to a quinone-type derivative. Since quinone-type compounds are generally colored materials, and would by themselves tend to contribute an undesirable discoloration to a stabilized diester, a hindered phenol alone would be unacceptable for stabilization. I have discovered, however, that when the hindered phenol is used in combination with a dialkyl phosphite, the undesirable coloration, associated with phenols used alone, is not produced. Apparently the dialkyl phosphite acts to convert the quinone-type derivatives to a colorless compound.

To illustrate the remarkable ability of the present additives to improve high temperature acid-number and color stability of lower alkanol diesters of terephthalic acid, the following examples are presented.

EXAMPLE I

In this example a control sample consisted of dimethyl terephthalate, derived from the heavy metal-bromine catalyzed oxidation of para-xylene with air in the liquid phase, and a sample composed of the control plus 0.0005 weight precent of 4,4'-thio-bis(6-tert-butyl-m-cresol) ether and diethyl phosphite. The samples were exposed to a temperature of 150° C. for the designated time period under a moving atmosphere of 0.5% oxygen, 19.5% carbon dioxide, and 80% nitrogen. Acid numbers were determined on the original sample and on aliquots at intervals of 4, 30 and 48 hours. The sample was dissolved in a 3:1 dimethyl formamide-toluene solvent and titrated to the phenol red end point with 0.1 N sodium hydroxide. The acid number is expressed as milligrams of potassium hydroxide required to neutralize one gram of sample.

TABLE I.—EFFECT OF ADDITIVES ON ACID NUMBER STABILITY, 150° C.

| | Original | 4 Hrs. | 30 Hrs. | 48 Hrs. |
|---|---|---|---|---|
| 1. Control | 0.02 | 0.122 | 0.26 | 0.324 |
| 2. Control+0.0005% Hindered Phenol+0.0005% Dialkyl Phosphite | 0.02 | 0.029 | 0.63 | 0.104 |

A similar favorable result can be obtained when 4,4'-thio-bis(6-tert-butyl-o-cresol) ether is substituted for the meta compound.

EXAMPLE II

In this example, samples of dimethyl terephthalate were exposed to temperatures of 175° C. and the colors were determined by the APHA (American Public Health Association) techinque. The hindered phenol is 4,4'-thio-bis(6-tert-butyl-m-cresol) ether, and the dialkyl phosphite is diethyl phosphite. It will be observed that a hindered phenol alone actually increases color degradation, as pointed out in my speculative discussion of the mechanism of stabilization presented hereinabove, whereas the inventive combination of hindered phenol with dialkyl phosphite substantially inhibits this.

TABLE II.—EFFECT OF ADDITIVES ON MOLTEN COLOR STABILITY, 175° C.

| Sample | APHA Colors | | | |
|---|---|---|---|---|
| | Original | 1 Day | 5 Days | 7 Days |
| 1. Control A | 10–15 | 70–80 | 200–250 | 250–300 |
| 2. Control A+0.0005% Hindered Phenol | 20–25 | 60–70 | 500 | 500 |
| 3. Control B | 20–25 | 90–100 | 200–250 | 250–300 |
| 4. Control B+0.0005% Hindered Phenol+0.0005% Dialkyl Phosphate | 15–20 | 30–35 | 125–150 | 50–60 |

Similar favorable results can be obtained when 4,4'-methylene-bis(2,6-di-tert-butyl-phenol) is substituted for the thio-bis-cresol compound.

EXAMPLE III

In this example, samples of dimethyl terephthalate (derived from the liquid phase air oxidation of para-xylene using a heavy metal and bromine as oxidation catalyst) were tested, employing various concentrations of 4,4'-thio-bis(6-tert-butyl-m-cresol) ether and diethyl phosphite. The following results are observed, and it is particularly noted that the inventive combination is markedly and uniquely effective in stabilizing both acid number and molten color.

TABLE III

| | Additive, P.p.m. | | Acid Number Stability, 150° C. | | Molten Color Stability, 175° C. | | |
|---|---|---|---|---|---|---|---|
| | Hindered Phenol | Dialkyl Phosphite | 24 Hrs. | 72 Hrs. | Original | 1 Day | 7 Days |
| Sample: | | | | | | | |
| 1 | 0 | 0 | 0.079 | 0.600 | 0/5 | 5 | 100/125 |
| 2 | 5 | 0 | 0.004 | 0.002 | 0/5 | 5 | 100/125 |
| 3 | 10 | 0 | 0.009 | 0.002 | 0/5 | 10/15 | 100/125 |
| 4 | 100 | 0 | 0.007 | 0.005 | 0/5 | 10/15 | 1,000/1,100 |
| 5 | 0 | 5 | 0.024 | 0.204 | 0/5 | 5 | 30/35 |
| 6 | 0 | 10 | 0.035 | 0.129 | 0/5 | 5 | 20/25 |
| 7 | 0 | 100 | 0.026 | 0.045 | 0/5 | 5 | 40/50 |
| 8 | 2.5 | 2.5 | 0.008 | 0.004 | 0/5 | 5/10 | 30/35 |
| 9 | 5 | 5 | 0.006 | 0.002 | 0/5 | 10/15 | 10/15 |
| 10 | 10 | 10 | 0.006 | 0.001 | 0/5 | 10/15 | 10/15 |
| 11 | 50 | 50 | 0.012 | 0.012 | 0/5 | 10/15 | 250/300 |

EXAMPLE IV

In this example, the behavior of unstabilized and stabilized samples of dimethyl terephthalates at 175° C. are compared, wherein the stabilizing combination is 4,4'-thios-bis(3-methyl-6-tert-butyl-phenol)ether with di-octyl phosphite.

TABLE IV

| Sample | Acid No. Stability (mg. KOH/g.) | | | Molten Color Stability (APHA) | | |
|---|---|---|---|---|---|---|
| | 6 Hrs. | 24 Hrs. | 72 Hrs. | Original | 1 Day | 7 Days |
| 1. Control C | 0.4 | 5.6 | 10.7 | 15/20 | 50/60 | 300/350 |
| 2. Control C+0.001% Hindered Phenol+0.0015% Dialkyl Phosphite | 0.017 | 0.023 | 2.2 | 15/20 | 30/35 | 35/40 |

EXAMPLE V

In this example, the behavior of unstabilized and stabilized samples of dimethyl terephthalate at 175° C. are compared, wherein the stabilizing combination is 4,4'-thio-bis(3-methyl-6-tert-butyl-phenol)ether with di-n-butyl phosphite.

TABLE V

| Sample | Acid No. Stability (mg. KOH/g.) 6 Hrs. | Molten Color Stability (APHA) | | |
|---|---|---|---|---|
| | | Original | 1 Day | 7 Days |
| 1. Control D | 0.50 | 10/15 | 25/30 | 150/200 |
| 2. Control D+0.001% Hindered Phenol+0.0005% Dialkyl Phosphite | 0.005 | 15/20 | 30/35 | 20/25 |

Similar favorable results can be obtained when di-isobutyl-phosphite is substituted for the di-n-butyl phosphite.

The utility of my stabilizing combination with mixtures of a lower alkanol diester of terephthalic acid and molten material has been demonstrated. A superpolyester of ethylene glycol with 85% dimethylterephthalate and 15% dimethyl isophthalate was prepared from a terephthalate inhibited with the inventive additive. The polycondensation reaction yields and rates were identical or superior to those that had been observed with untreated diesters, and after the superpolyester had been drawn and woven, the cloth was whiter and brighter than cloth produced from unstabilized superpolyester.

From the foregoing presentation it is evident that there has been provided an outstanding procedure for improving the high temperature acid-number stability and color stability of lower alkanol diesters of terephthalic acid. The additives may be added to the diesters in any convenient way, advantageously while the latter are in molten form, and the resultant composition has exceptional stability at temperatures in the 150–300° C. range. Moreover, the stabilized diesters have polymerization characteristics which are indistinguishable from unstabilized diesters, while films and fibers prepared from the former are markedly superior with respect to color and physical properties.

While the invention has been described in conjunction with particular embodiments thereof, it is manifest that many alternatives, modifications and variations may be employed. Accordingly, it is intended to embrace all such alternatives, modifications and variations as fall within the spirit and broad scope of the appended claims.

I claim:
1. As new compositions of matter, lower alkanol diesters of terephthalic acid containing
   (A) a hindered phenol selected from the group consisting of 4,4'-thio-bis(6-tert-butyl-m-cresol) ether, 4,4' - thio - bis(6 - tert - butyl - o - cresol) ether, 4,4' - methylene bis (2,6 - di - tert butyl phenol), 4,4' - bis (2,6 - di - tert - butyl - phenol), 2,2'- methylene bis (4 - methyl - 6 - tert - butyl phenol), and 2,2' - methylene bis (4 - ethyl - 6 - tert - butyl phenol), and
   (B) a dialkyl phosphite having the formula

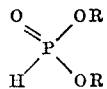

wherein R represents alkyl groups containing from 1 to 4 carbon atoms.

2. The compositions of claim 1 wherein said hindered phenols and said dialkyl phosphite are each present in amounts up to about 0.02 weight percent.

3. The composition of claim 2 wherein said hindered phenol is 4,4' - thio - bis(6 - tert - butyl - m - cresol) ether and said dialkyl phosphite is diethyl phosphite.

4. The composition of claim 2 wherein said hindered phenol is 4,4' - thio - bis(6 - tert - butyl - o - cresol) ether and said dialkyl phosphite is diethyl phosphite.

5. As a new composition of matter, dimethyl terephthalate containing, in amounts of up to about 0.001 weight percent each
   (A) 4,4'-thio-bis(6-tert-butyl-m-cresol) ether and
   (B) diethyl phosphite.

References Cited

UNITED STATES PATENTS

| 2,612,515 | 9/1952 | Hudson et al. | 260—475 |
| 2,894,979 | 7/1959 | Leach | 260—475 |

JAMES A. PATTEN, *Primary Examiner.*

E. J. SKELLY, *Assistant Examiner.*

U.S. Cl. X.R.

260—75

PO-1050
(5/69)

UNITED STATES PATENT OFFICE
CERTIFICATE OF CORRECTION

Patent No. 3,445,504      Dated 5/20/69

Inventor(s) Paul J. Mehalso

It is certified that error appears in the above-identified patent and that said Letters Patent are hereby corrected as shown below:

Column 2, line 21, "tertbutyl" should be -- tert-butyl --; line 64, "relatlve" should be -- relative --.

Column 3, line 1, "hense" should be -- hence --; line 25, "derivatives" should be -- derivative --.

Column 4, Table I, under heading "30 Hrs.", "0.63" should be -- 0.063 --; Table II, No. 4, under heading "Sample", "Phosphate" should be -- Phosphite --; Table III, heading "Additive, P.p.m." should be -- Additive, P.P.M. --.

Column 5, line 2, "terephthalates" should be -- terephalate --; line 4, "thios" should be -- thio --.

SIGNED AND
SEALED
MAR 10 1970

(SEAL)
Attest:

Edward M. Fletcher, Jr.
Attesting Officer

WILLIAM E. SCHUYLER, JR.
Commissioner of Patents